United States Patent [19]

Murphy

[11] Patent Number: 4,477,617
[45] Date of Patent: Oct. 16, 1984

[54] MOLDING RESINS BASED ON BLENDS OF ACID COPOLYMER/HYDROCARBON POLYOLEFIN/REINFORCING FIBER/WETTING AGENT

[75] Inventor: Charles V. Murphy, Wilmington, Del.

[73] Assignee: E. I. DuPont de Nemours and Company, Wilmington, Del.

[21] Appl. No.: 400,244

[22] Filed: Jul. 21, 1982

[51] Int. Cl.$^3$ .................... C08K 7/14; C08K 3/40; C08K 5/41; C08K 5/09

[52] U.S. Cl. .................... 524/136; 524/140; 524/141; 524/145; 524/156; 524/157; 524/158; 524/159; 524/160; 524/165; 524/166; 524/213; 524/216; 524/293; 524/294; 524/314; 524/375; 524/376; 524/377; 524/494; 524/505; 524/522

[58] Field of Search ............... 524/287, 293, 294, 494, 524/505, 165, 522, 140, 223, 166, 141, 145, 156, 157, 158, 160, 314, 375, 376, 377, 213, 216, 377, 159, 136

[56] References Cited

U.S. PATENT DOCUMENTS

| | | | |
|---|---|---|---|
| 3,639,331 | 2/1972 | Hattori et al. | 523/209 |
| 3,640,943 | 2/1972 | Bostick et al. | 523/209 |
| 3,856,724 | 12/1974 | O'Connor et al. | 524/35 |
| 4,014,847 | 3/1977 | Lundberg et al. | 524/296 |
| 4,026,967 | 5/1977 | Flexman et al. | 525/289 |
| 4,098,406 | 7/1978 | Otten et al. | 428/35 |
| 4,129,549 | 12/1978 | Kahane | 523/207 |
| 4,248,990 | 2/1981 | Pieski et al. | 526/317 |
| 4,252,924 | 2/1981 | Chatterjee | 526/317 |
| 4,293,664 | 10/1981 | Lustig et al. | 525/22 |
| 4,321,337 | 3/1982 | Smith | 525/329.5 |
| 4,371,583 | 2/1983 | Nelson | 524/522 |

FOREIGN PATENT DOCUMENTS 0058980  1/1982  European Pat. Off.

OTHER PUBLICATIONS

Chem Abs 9-92503w (1979) Kodera et al (J79-152156).
Derwent Abst 42997B/23 (4-1979) J54052156.
Derwent Abst 28099D/16 (2-81)J56019754).
Derwent Abst 55700C/32 (6-80)J55082138).

Primary Examiner—Herbert J. Lilling

[57] ABSTRACT

Blends of hydrocarbon polyolefin, reinforcing fiber, acid copolymer of $\alpha$-olefin and $\alpha,\beta$-ethylenically unsaturated carboxylic acid and wetting agent are provided wherein the acid copolymer has from 0 to about 90 percent of the acid groups ionized by neutralization with metal ions. Such blends have excellent Izod impact values and fast molding cycles and as such are particularly suitable as molding resins.

13 Claims, No Drawings

MOLDING RESINS BASED ON BLENDS OF ACID COPOLYMER/HYDROCARBON POLYOLEFIN/REINFORCING FIBER/WETTING AGENT

BACKGROUND OF THE INVENTION

1. Field of the Invention

This invention relates to molding resins and more specifically it relates to molding resins based on acid copolymer/hydrocarbon polyolefin/reinforcing fiber blends modified by the addition of wetting agents.

2. Description of the Prior Art

U.S. Pat. No. 3,639,331, "Glass Fiber Reinforced Resins Containing Dispersion Aid" discloses improved glass dispersibility in a thermoplastic resin at glass concentrations ranging from 20-90 weight % using as the dispersing aid a hydrocarbon lubricant, or a plasticizer or a low molecular weight resin at concentrations ranging from 0.5 to 8.0 weight %. This patent primarily refers to low molecular weight oils and plasticizer as dispersing aids using an 80% by weight glass concentrate and blending this with unreinforced polymer to give a final product having 20% glass fiber content. This two step blending process shows no significant improvement in physical properties.

U.S. Pat. No. 3,640,943, "Polymer-Filler Composition", discloses a composition comprising a base polymer, a filler and a surface-active additive which is a block copolymer (polydiphenyl siloxane-polydimethylsiloxane). The block copolymer additive contains at least two polymerized comonomers, one of which is compatible with the base polymer thereby imparting stability to the composition and the second of which is surface active in the composition so that the block copolymer is concentrated at the interface between the filler and base polymer to provide a bond therebetween. Although this patent claims improved stiffness and greater dimensional stability, other physical properties were not significantly improved.

In neither one of the above patents is there any disclosure of blends based on ionomers nor of the use of simple wetting agents to give improved physical properties at high filler loadings in hydrophobic polymer systems.

U.S. Pat. No. 3,856,724 discloses reinforced thermoplastic compositions based upon a reinforcing agent such as glass fiber or alpha cellulose with a polyolefin such as polyethylene, polypropylene, polyisobutylene, etc. and a minor amount of an ionic hydrocarbon copolymer, such as an ethylene-methacrylic acid copolymer which has been reacted with an ionizable metal compound. It is disclosed that generally, the amount of the ionic hydrocarbon copolymer will be from about 0.05 to about 35 percent by weight and, preferably, from about 1 to about 30 percent by weight based on the weight of the reinforced thermoplastic composition.

Copending patent application Ser. No. 236,718 filed Feb. 23, 1981, now U.S. Pat. No. 4,387,188 (Attorney Docket No. AD-5095) discloses compositions of about 38 to 90% by weight of acid copolymer (from 0 to about 90% neutralized), about 5–60% by weight of linear polymer of α-olefin and about 2–50% by weight of reinforcing fiber.

SUMMARY OF THE INVENTION

According to the present invention, there is provided a composition consisting essentially of (a) from about 5 to about 85 percent by weight of acid copolymer selected from the group consisting of direct copolymers and graft copolymers wherein, (A) said direct copolymer is the copolymer of α-olefin having the formula R—CH=CH$_2$, where R is a radical selected from the class consisting of hydrogen and alkyl radicals having from 1 to 8 carbon atoms and α,β-ethylenically unsaturated carboxylic acids having from 3 to 8 carbon atoms, the acid moieties being randomly or nonrandomly distributed in the polymer chain, (1) the α-olefin content of the copolymer being at least 25 weight percent, based on the α-olefin-acid copolymer, (2) the unsaturated carboxylic acid content of the copolymer being from about 0.5 to about 50 weight percent, based on the α-olefin-acid copolymer, and (3) any other monomer component optionally copolymerized in said copolymer being monoethylenically unsaturated, and (B) said graft copolymer is obtained by grafting 0.1 to 5 percent by weight of α,β-unsaturated carboxylic acid having 3 to 8 carbon atoms or an unsaturated carboxylic acid anhydride onto a preformed polyolefin backbone derived from ethylene or ethylene and C$_3$ to C$_8$ α-olefin, in which polyolefin backbone any other optionally copolymerized monomer component is monoethylenically unsaturated, said direct or graft acid copolymers having from 0 to about 90 percent of the carboxylic acid groups ionized by neutralization with metal ions, said ionic copolymers having solid state properties characteristic of cross-linked polymers and melt-fabricability properties characteristic of uncrosslinked thermoplastic polymers, (b) from about 10 to about 90 percent by weight of at least one hydrocarbon polyolefin selected from the group consisting of linear polymer of α-olefin having the formula R—CH=CH$_2$, where R is a radical selected from the class consisting of hydrogen and alkyl radicals having from 1 to 8 carbon atoms; copolymer of ethylene and propylene where the ethylene content is up to about 20% by weight; linear copolymer of ethylene with at least one α-olefin comonomer having from four to ten carbon atoms, where the α-olefin comonomer content is from about 2 to about 25 percent by weight; and low density branched homopolymer of ethylene;

(c) from about 5 to about 50 percent by weight of at least one reinforcing fiber selected from the group consisting of glass fiber, natural mineral fiber, man made mineral fiber and high modulus organic fiber; and (d) from about 0.05 to about 5.0 percent by weight of at least one wetting agent selected from the group consisting of alkanol amides; betaine derivatives; block copolymers comprising a series of condensates of ethylene oxide with hydrophobic bases formed by condensing propylene oxide with propylene glycol; ethoxylated compounds comprising alcohols, alkyl phenols, amines and amides; sulfonated derivatives comprising alkyl sulfonates, aryl sulfonates, alkyl-aryl sulfonates, amine and amide sulfonates, olefin sulfonates, sulfosuccinates, sulfonated fatty acid esters, sulfonates of ethyoxylated alkyl phenols and of oils and of fatty acids, naphthalene and alkyl naphthalene sulfonates, condensed naphthalene sulfonates, naphthalene and alkyl naphthalene sulfonates and petroleum sulfonates, and dodecyl and tridecyl benzene sulfonates; dodecyl and tridecyl sulfonic acids; sulfates of alcohols, of ethoxylated alcohols, of ethoxylated alkyl phenols, of oils, of fatty acids, of fatty esters, alkaryl sulfates, and sodium, ammonium and amine salts of alcohol sulfates; phosphate derivatives comprising phosphate esters, phosphate alcohol ethoxylates, phosphate ether ethoxylates, phosphate alkyl acids and phosphate alkyl quaternaries; quaternary surfactants; and liquid polyesters.

As used herein, the term "consisting essentially of" means that the named ingredients are essential; however, other ingredients which do not prevent the advantages of the present invention from being realized can also be included.

DETAILED DESCRIPTION OF THE INVENTION

Surprisingly, it was found that relatively small amounts of wetting agents enable substantial amounts of reinforcing agents to be readily incorporated into ionomer blends. The toughness and flexibility of these compositions are significantly improved over compositions without surfactant.

Acid copolymers suitable for the present invention are selected from the group consisting of direct copolymers and graft copolymers wherein (A) said direct copolymer is the copolymer of $\alpha$-olefin having the formula $R-CH=CH_2$, where R is a radical selected from the class consisting of hydrogen and alkyl radicals having from 1 to 8 carbon atoms, and $\alpha,\beta$-ethylenically unsaturated carboxylic acid having from 3 to 8 carbon atoms, the acid moieties being randomly or nonrandomly distributed in the polymer chain, (1) the $\alpha$-olefin content of the copolymer being at least 25 weight percent, based on the $\alpha$-olefin-acid copolymer, (2) the unsaturated carboxylic acid content of the copolymer being from about 0.5 to about 50 weight percent, based on the $\alpha$-olefin-acid copolymer, and (3) any other monomer component optionally copolymerized in said copolymer being monoethylenically unsaturated, and (B) said graft copolymer being obtained by grafting 0.1 to 5 percent by weight of $\alpha,\beta$-unsaturated carboxylic acid having 3 to 8 carbon atoms or an unsaturated carboxylic acid anhydride onto a preformed polyolefin backbone derived from ethylene or ethylene and $C_3$ to $C_8$ $\alpha$-olefin, in which polyolefin backbone any other optionally copolymerized monomer component is monoethylenically unsaturated, said direct or graft acid copolymers having from 0 to about 99% of the carboxylic acid groups ionized by neutralization with metal ions, said ionic copolymers having solid state properties characteristic of crosslinked polymers and melt fabricability properties characteristic of uncrosslinked thermoplastic polymers. The acid copolymers are further described in U.S. Pat. Nos. 4,351,931; 4,026,967; 4,252,924; and 4,248,990. The ionic copolymers are described in U.S. Pat. No. 3,264,272. Acid copolymers can also be derived by reacting $\alpha$-olefin polymers with unsaturated acids. Hence, polyolefins or olefin copolymers can be reacted with $\alpha,\beta$-unsaturated acids either thermally or by using a peroxide catalyst to give acid functionalized graft copolymers. These polymers can be used in place of or in conjunction with the directly copolymerized acid copolymers or they can be partially neutralized to give materials which can be used in place of or in conjunction with the directly copolymerized acid copolymers or their ionomers.

The acid copolymers generally are present in the amount of from about 5 to about 85 percent by weight in the reinforced compositions of the present invention. Preferably the acid copolymer is present in the amount of from about 20 to about 60 percent and most preferably from about 25 to about 55 weight percent.

Higher levels of acid copolymers are preferred because they result in greater resistance to Gardner impact and improved room temperature Izod impact strength.

Preferably the $\alpha,\beta$-ethylenically unsaturated acid is acrylic acid or methacrylic acid and most preferably it is methacrylic acid. The ionic copolymer is preferably neutralized to the extent of from about 5 to about 80 percent and most preferably from about 15 to about 75 percent. The $\alpha$-olefin content of the copolymer is preferably at least about 70 weight percent, based on the $\alpha$-olefin-acid copolymer and most preferably it is at least about 88 weight percent. The unsaturated carboxylic acid content of the copolymer is preferably from about 3 to about 30 weight percent and most preferably from about 3 to about 12 weight percent, based on the $\alpha$-olefin-acid copolymer.

The metal ions are preferably selected from the group consisting of sodium, potassium, calcium, magnesium, zinc and strontium, and most preferably the metal ion is zinc.

The hydrocarbon polyolefin suitable in the blends of the present invention is selected from the group consisting of linear polymer of $\alpha$-olefin having the formula $R-CH=CH_2$, where R is a radical selected from the class consisting of hydrogen and alkyl radicals having from 1 to 8 carbon atoms; copolymer of ethylene and propylene where the ethylene content is up to about 20% by weight; linear copolymer of ethylene with at least one $\alpha$-olefin comonomer having from 4 to 10 carbon atoms, where the $\alpha$-olefin comonomer content is from about 2 to about 25 percent by weight; and low density branched homopolymer of ethylene. Preferably the linear polyolefin is selected from the group consisting of polyethylene, polypropylene, polybutene-1, poly-4-methyl pentene-1, and copolymers thereof and most preferably the linear polyolefin is polyethylene.

When polyethylene is the linear polyolefin in the blends of the present invention, it has generally a density of from about 0.91–0.97, preferably from about 0.935 to about 0.970 and most preferably from about 0.95 to 0.97. The melt index (MI) of the linear polyethylene is generally from about 0.1 to about 100, preferably from about 0.2 to about 5 and most preferably from about 0.3 to about 3. Linear homopolymers of ethylene, such as a 3 MI narrow molecular weight distribution resin, appear to give adequate toughness and heat deflection temperatures. However, if higher toughness is needed, a medium molecular weight distribution homopolymer with a 0.45 melt index can be used. Such materials will reduce the melt flow of the final blend.

Generally, from about 10 to about 90 percent by weight of linear polyolefin is used in the blends of the present invention. Preferably the amount is from about 20 to about 55 percent by weight.

The third essential ingredient of the blends of the present invention is the reinforcing fiber which can be selected from the group consisting of glass fibers, natural mineral fibers, man-made, manufactured mineral fibers (e.g., graphite, aluminum oxide, etc.), and high modulus organic fibers. The reinforcing fibers generally used in thermoplastic materials are subjected to shearing during extrusion and molding, hence their lengths and aspect ratios are reduced. Glass fibers usually range from 0.001 to 0.030 inches in length after compounding, and minerals are usually shorter. Any compounding system which does not lower the lengths or aspect ratios to this degree should give improved stiffness properties in the final composite materials. Before compounding, the reinforcing fibers have an L/D aspect ratio of from about 10 to about 1500.

The type of glass or mineral fiber employed does not appear to be critical. However, fibers with high L/D ratios appear to give higher heat deflection temperatures. Commercial glass fibers sold as reinforcing agents for thermoplastics are useful for this application and appear to give better properties than the shorter mineral fibers.

Owens-Corning's fiber glass comes with various types of coatings. Their available products have sizing denoted by the following numbers and are recommended for the listed thermoplastics.

| Sizing | Recommended for Thermoplastics |
| --- | --- |
| 409 | Polycarbonate and Acetal |
| 411 | Nylon |
| 414 | ABS and SAN |
| 415 | HDPE and Polycarbonate |
| 418 | In Polycarbonate at Low Loadings |
| 419 | Thermoplastic Polyester and Nylon |
| 452 | Polypropylene |
| 497 | Polyphenylene Oxide |

Glass OCF-415AA or OCF-415BB and OCF-419AA appear to give the best combination of tensile properties, toughness and heat deflection temperature.

A similar glass from Pittsburgh Plate Glass, PPG-3450, gave good results.

The preferred reinforcing fibers are glass fibers and mineral fibers having an L/D aspect ratio of from about 20 to about 1000, and most preferably of from about 100 to about 400.

Generally, the amount of the reinforcing fiber is from about 5 to about 50 percent by weight. Preferably the fiber should be present in from about 10 to about 35 percent by weight and most preferably from about 12 to about 25 percent by weight.

The fourth essential ingredient of the blend is a wetting agent. For the purposes of the present invention, a wetting agent is a material which when added in low concentration modifies the surface tension between the fibrous reinforcement and the polymer component. Surfactants, as generally classified in McCutcheon's "Emulsifiers and Detergents—North American Edition—1981" are one well known class of wetting agents. Surfactants which are effective in attaining the purposes of this invention are those which are selected from the group consisting of alkanol amides; betaine derivatives; block copolymers comprising a series of condensates of ethylene oxide with hydrophobic bases formed by condensing propylene oxide with propylene glycol; ethoxylated compounds comprising alcohols, alkyl phenols, amines and amides; sulfonated derivatives comprising alkyl sulfonates, aryl sulfonates, alkyl-aryl sulfonates, amine and amide sulfonates, olefin sulfonates, sulfosuccinates, sulfonated fatty acid esters, sulfonates of ethoxylated alkyl phenols and of oils and of fatty acids, naphthalene and alkyl naphthalene sulfonates, condensed naphthalene sulfonates, naphthalene and alkyl naphthalene sulfonates and petroleum sulfonates, and dodecyl and tridecyl benzene sulfonates; dodecyl and tridecyl sulfonic acids; sulfates of alcohols, of ethoxylated alcohols, of ethoxylated alkyl phenols, of oils, of fatty acids, of fatty esters, alkaryl sulfates, and sodium, ammonium and amine salts of alcohol sulfates; phosphate derivatives comprising phosphate esters, phosphate alcohol ethoxylates, phosphate ether ethoxylates, phosphate alkyl acids and phosphate alkyl quaternaries; quaternary surfactants.

The number of surfactants in existence is enormous; the examples named above can be replaced by other close analogs with good results and without departing from the spirit of this invention.

The preferred surface active agents are selected from the group consisting of alkanol amides; betaine derivatives; block copolymers consisting essentially of a series of condensates of ethylene oxide with hydrophobic bases formed by condensing propylene oxide with propylene glycol; ethoxylated compounds consisting essentially of ethoxylated alcohols, alkyl phenols, amines and amides; sulfonated derivatives consisting essentially of alkyl sulfonates, alkyl-aryl sulfonates, amine and amide sulfonates, sulfonated fatty acid esters, sulfonates of ethoxylated alkyl phenols and of oils and of fatty acids, naphthalene and alkyl naphthalene sulfonates, and condensed naphthalene sulfonates and dodecyl and tridecyl benzene sulfonates; sulfates of alcohols, of ethoxylated alcohols, of fatty acids, alkaryl sulfates, and sodium, ammonium and amine salts thereof; phosphate derivatives consisting essentially of phosphate esters, phosphate alcohol ethoxylates, phosphate ether ethoxylates, phosphate alkyl acids and phosphate alkyl quaternaries; quaternary surfactants.

The most preferred surfactants are selected from the group consisting of alkyl sulfonates, alkyl-aryl sulfonates, amine and amide sulfonates, sulfonated fatty acid esters, sulfonates of ethoxylated alkyl phenyls and of oils and of fatty acids, naphthalene and alkyl naphthalene sulfonates, and condensed naphthalene sulfonates; sulfates of alcohols, of ethoxylated alcohols, of fatty acids, alkaryl sulfates, and sodium, ammonium and amine salts of alcohol sulfates; phosphate esters.

In using surface active agents in the compositions of this invention, the amount is from about 0.05% to about 5% by weight, and preferably from about 0.1 to about 2.5%.

In many cases, for the user's convenience, the surfactant may be offered as a solution or dispersion in water or in an organic solvent. In such cases, the percentages in the preceding paragraph refer to the amount of active ingredient present—and not to the product as supplied.

Liquid polyesters are a second class of wetting agents useful in the practice of this invention. These materials are, in general, condensation products of polybasic acids and polyols. The term "liquid" in the context of the present invention is used to mean pourable at room temperture. The acid component is most often a saturated aliphatic dibasic acid or an aromatic dibasic acid; adipic acid, azelaic acid, phthalic acid, sebacic acid, and glutaric acid, or mixtures of these acids are commonly used. The polyol can be an aliphatic polyol or a poly oxyalkylene polyol, such as ethylene glycol, propylene glycol, 1,4- and 1,3-butane glycol, diethylene glycol, and polyethylene glycol. Preferred polyester compositions would consist of an acid component of which greater than 50% by weight are aliphatic dibasic acids, and a polyol component of aliphatic polyol or even more preferably aliphatic glycol. Most preferred compositions are based on adipic or azelaic acid, and propylene glycol or the 1,3- or 1,4-butane glycol. The molecular weight of these plasticizers can vary from a low of a few hundred up to a high of about 10,000. The molecular weight of commercial products is seldom specified; however, typically in the trade, the molecular weight range of the product is classified as low, medium or high. The preferred range for purposes of this invention is that classified as medium.

In addition to the required components, it is customary to add small amounts of pigments or fillers or blowing agents to the other ingredients of the blend. These materials, along with mold release agents and lubricants, can be added to the polymer blend in amounts that are normally used without adversely affecting the physical properties of the blend.

In copending application Ser. No. 236,718, it was shown that blends of acid copolymer, linear polyolefin and reinforcing fiber having superior physical properties can be prepared without the use of a surfactant. However, such superior properties can only be achieved in an apparatus such as a twin screw extruder which results in extremely high shear forces. In older mixing devices such as single screw extruders which cannot be operated at sufficiently high shear rates, it was found that toughness was erratic and generally lower than desired. In addition, when subjected to repeated flexing, sheets made from the blends containing acid copolymer or lower ionomerized levels of acid copolymers without surfactants broke easily.

The following examples serve to illustrate the present invention. All parts and percentages are by weight unless otherwise specified. As with most thermoplastic compositions, it is desired to achieve an optimum balance of properties. On occasion, the achievement of high toughness can result in reduction of flexural modulus or heat deflection temperature. Thus, in any particular application, the choice of ingredients will be determind by the balance of properties desired.

PREPARATION OF BLENDS

All of the surfactants evaluated were dissolved in small quantities of isopropyl alcohol (about 100 grams) and manually dispersed on the reinforcing fibers or on the entire composite blend in a large polyethylene bag. The bag was filled with air and manually shaken for 1-2 minutes. The alcohol was allowed to evaporate in a laboratory hood overnight prior to either blending as described above (if surfactant/alcohol solution was applied only to the reinforcing fiber) or extrusion. The blends of Examples 1 through 29, as well as the blends of the Comparative Examples, were extruded on a Sterling 2" single screw extruder using a 10B screw with a single hole die. Example 30, because of its high glass content, could not be processed on the single screw extruder. This formulation was processed on a 28 mm W&P twin screw extruder at the same temperature using a two-hole die. The screw configuration used was designed to give the minimum amount of shear. The extruded strand was quenched (cooled) in a water trough and pelletized through a Cumberland, Size 6 Cutter.

PREPARATION OF TEST PIECES

All test pieces as specified by the various ASTM tests were made on a Van Dorn 6-ounce C Injection Molding Machine at temperatures ranging from 210° to 225° C. with an injection pressure of 1100 psi. The injection and hold cycle times were both 20 seconds.

| Test Procedures | |
|---|---|
| Test | ASTM Method |
| Notched Izod | D-256 |
| Tensile Impact | D-18225 |
| Flex Modulus | D-790 |
| Gardner Impact | D-3029-72 |
| 180° Flex Bend Test* | — |
| Elongation, Break % | D-638 |

*This is a subjective test in which a 3" × 5" × 0.125" injection molded plaque is bent in one direction at 180° and then is bent in the opposite direction at 180°. This constitutes one full cycle. After each cycle, the plaque is observed for breaking or cracking.

EXAMPLES 1 TO 14 AND COMPARATIVE EXAMPLES 1a TO 1d

The physical properties of these Examples are summarized in Table I. A 55/30/15 "Surlyn" (9% MAA/18% neutralized)HDPE (MI 0.45)/Glass Reinforcing fiber (OCF419AA-3/16" length) composition was used for these Examples. Comparative Examples 1a to 1d show the problem of limited glass fiber dispersibility (after injection molding) and representative toughness. In addition these samples show limited flex resistance properties as evidenced by relatively low Break % Elongation and a significantly cracked area after the 180° Flex Bend Test (C-1d).

Examples 1 to 14 show the effect of adding a broad range of wetting agents of varying types (e.g., anionic, nonionic and amphoteric surfactants, polyester plasticizer, fatty acid) to the above composition obtaining an improvement in glass fiber dispersibility as evidenced by reduced glass clusters. The use of these additives surprisingly has also substantially improved toughness properties while retaining high moduli (stiffness). "Duponol" G, an amine long chain alcohol sulfate/anionic type and "Examide" CS, a coco imidazoline sulfonated/amphoteric type give the best balance of toughness and stiffness properties. However, all of the wetting agents show varying degrees of improved toughness and flexibility properties compared to Comparative Examples 1a to 1d.

TABLE I

| Examples | Wetting Agent, % | | Glass Clusters (after molding) | Flex Modulus | | Elongation Break % | Toughness Properties | | | | | | 180° Flex Bend Test[13] |
|---|---|---|---|---|---|---|---|---|---|---|---|---|---|
| | | | | | | | 23° C. Notched Izod | | Tensile Impact | | Gardner Impact | | |
| | | | | MPa | kpsi | % | J/m | ft-lbs/in | kJ/m² | ft-lbs/in² | J/mm | in-lbs/mil | |
| C-1a | — | | Yes | 1034 | 151 | — | 406 | 7.6 | — | — | — | — | — |
| C-1b | — | | Yes | 1234 | 179 | 15 | 347 | 6.5 | 130 | 62 | 4.1 | 0.9 | — |
| C-1c | — | | None | 1205 | 175 | 20 | 378 | 7.1 | 96 | 45.1 | 1.9 | 0.42 | — |
| C-1d | — | | None | 1185 | 172 | 10 | 327 | 6.9 | 109 | 52 | 2.1 | 0.48 | Passed 10 cycles, 33% cracked |
| 1 | No. 1[1] | 1.0 | None | 1013 | 147 | — | 513 | 9.6 | — | — | — | — | — |
| 2 | No. 1 | 0.5 | None | 1168 | 169 | 110 | 960 | 18.0 | 162 | 77 | 8.1 | 1.82 | Passed 10 cycles, No cracks |
| 3 | No. 2[2] | 0.5 | None | 1106 | 160 | 30 | 806 | 15.0 | 146 | 70 | 6.4 | 1.44 | Passed 10 cycles, 33% cracked |

TABLE I-continued

| Examples | Wetting Agent, % | Glass Clusters (after molding) | Flex Modulus MPa | Flex Modulus kpsi | Elongation Break % | 23° C. Notched Izod J/m | 23° C. Notched Izod ft-lbs/in | Tensile Impact kJ/m² | Tensile Impact ft-lbs/in² | Gardner Impact J/mm | Gardner Impact in-lbs/mil | 180° Flex Bend Test[13] |
|---|---|---|---|---|---|---|---|---|---|---|---|---|
| 4 | No. 3[3] 0.5 | V.V. Few | 1154 | 167 | 75 | 797 | 15.0 | 199 | 95 | 5.2 | 1.18 | Passed 10 cycles, No cracks |
| 5 | No. 4[4] 0.5 | None | 984 | 143 | 120 | 929 | 17.4 | 274 | 131 | 6.3 | 1.42 | — |
| 6 | No. 5[5] 2.0 | None | 752 | 109 | 120 | 521 | 10.0 | 69 | 33 | 7.6 | 1.7 | Passed 10 cycles, No cracks |
| 7 | No. 6[6] 1.0 | None | 1092 | 158 | — | 502 | 9.4 | — | — | — | — | — |
| 8 | No. 6 2.0 | None | 1165 | 169 | 110 | 640 | 12.0 | 414 | 197 | 6.9 | 1.54 | — |
| 9 | No. 7[7] 0.5 | None | 1141 | 166 | 95 | 679 | 12.7 | 144 | 69 | 6.7 | 1.5 | Passed 10 cycles, No cracks |
| 10 | No. 8[8] 2.0 | V.V. Few | 1116 | 162 | 75 | 806 | 15.1 | 191 | 91 | 7.0 | 1.57 | Passed 10 cycles, No cracks |
| 11 | No. 9[9] 0.5 | None | 1074 | 156 | 10 | 446 | 8.4 | 140 | 67 | 3.3 | 0.74 | Passed 10 cycles, 5% cracked |
| 12 | No. 10[10] 0.5 | None | 1220 | 177 | 35 | 867 | 16.2 | 218 | 104 | 8.9 | 2.0 | Passed 10 cycles, No cracks |
| 13 | No. 11[11] 0.5 | None | 1148 | 167 | 85 | 633 | 12.0 | 167 | 80 | 6.1 | 1.36 | Passed 10 cycles, No cracks |
| 14 | No. 12[12] 2.0 | V.V. Few | 1058 | 154 | 10 | 414 | 8.0 | 96 | 46 | 2.7 | 0.61 | Passed 10 cycles, 5% cracked |

Footnotes for Table I
[1]"Duponol" G - anionic - available from E. I. du Pont de Nemours and Company - amine long chain alcohol sulfate.
[2]"Duponol" C - anionic - available from E. I. du Pont de Nemours and Company - sodium lauryl sulfate.
[3]"Sipon" L-22 - anionic - available from Alcolac Inc. - ammonium lauryl sulfate.
[4]"Zelec" UN - anionic - available from E. I. du Pont de Nemours and Company - fatty alcohol phosphate.
[5]"Aerosol" OT - anionic - available from American Cyanamid Co. - sodium dioctyl sulfosuccinate.
[6]"Merpol" HC - nonionic - available from E. I. du Pont de Nemours and Company - ethylene oxide condensate comprising long chain alcohol reacted with 15 moles of ethylene oxide.
[7]"Triton" N405 - nonionic - available from Rohm & Haas Co. - nonyl phenoxypolyethoxyethanol.
[8]"Pluronic" F-98 - anionic - available from BASF Wyandotte Corporation-α-hydro-omega-hydroxy-poly-(oxyethylene)poly(oxypropylene)poly-(oxyethylene)block copolymer
[9]"Zonyl" A - nonionic - available from E. I. du Pont de Nemours and Company - ethoxylated phosphate.
[10]"Examide" - amphoteric - available from Soluol Chemical Co., Inc. - Coco imidazoline sulfonated.
[11]"Plastolein" 9776 - plasticizer/wetting agent - available from Emery Ind. - polyester plasticizer.
[12]Stearic Acid - fatty acid - available from Emery Ind. - "Emersol" 6349.
[13]3" × 3" × 0.125" injection molded plaques cycles to failure, condition

EXAMPLES 15 TO 21 AND COMPARATIVE EXAMPLE 2

The physical properties of these Examples are shown in Table II and they show the ranges of wetting agent concentrations that are effective at a particular glass fiber concentration. Examples 15–18 and Comparative Examples 1b show the efficacy of a surfactant ("Duponol" G) at 0.05–2.0 wt. % concentration in a 15 wt. % glass fiber containing composition ("Surlyn"/HDPE/Glass Fiber-55/30/15). Both toughness and elongation are improved and glass clusters are eliminated with the addition of surfactant. The best balance of properties (toughness, flexibility and stiffness) are achieved with this particular surfactant at a concentration approximating 0.25 wt. % (Example 16). Examples 19 and C-2 show a similar effect at a 20 wt. % glass fiber content ("Surlyn"/HDPE/Glass Fiber-50/30/20). At higher surfactant concentrations some sacrifice of flex modulus is evidenced and at the lowest surfactant concentration only marginal improvements in toughness are shown but increased elongation is observed. For each surfactant, the appropriate level is determined empirically for the balance of properties desired. Examples 20 and 21 show that high surfactant concentrations (2.5–5.0 wt. %) are required to obtain adequate toughness in blends containing 40 wt. % glass fiber concentration, ("Surlyn"/HDPE/Glass Fiber/Surfactant—40/20/40/2.5 and 40/20/40/5.0).

TABLE II

| Examples | Wetting Agent, % | Glass Clusters (after molding) | Flex Modulus MPa | Flex Modulus kpsi | Elongation Break % | 23° C. Notched Izod J/m | 23° C. Notched Izod ft-lbs/in | Tensile Impact kJ/m² | Tensile Impact ft-lbs/in² | Gardner Impact J/mm | Gardner Impact in-lbs/mil |
|---|---|---|---|---|---|---|---|---|---|---|---|
| C-1b | — | Yes | 1234 | 179 | 15 | 347 | 6.5 | 130 | 62 | 4.1 | 0.9 |
| 15 | No. 1 0.05 | None | 1222 | 177 | 40 | 399 | 7.5 | 121 | 57 | 4.1 | 0.9 |
| 16 | No. 1 0.25 | None | 1220 | 177 | 50 | 879 | 16.5 | 170 | 81 | 7.0 | 1.6 |
| 17 | No. 1 1.0 | None | 992 | 144 | 160 | 437 | 8.2 | 239 | 114 | 5.7 | 1.3 |
| 18 | No. 1 2.0 | None | 867 | 126 | 80 | 518 | 9.7 | 191 | 91 | 5.3 | 1.2 |
| C-2 | — | Yes | 1408 | 204 | 5 | 289 | 5.4 | 106 | 50 | 3.3 | 0.7 |
| 19 | No. 1 0.25 | None | 1495 | 217 | 50 | 850 | 16.0 | 156 | 74 | 4.4 | 1.0 |
| 20* | No. 1 2.5 | None | 1927 | 280 | 45 | 211 | 4.0 | 18 | 9 | 2.4 | 0.54 |
| 21* | No. 1 5.0 | None | 1016 | 147 | 45 | 197 | 3.0 | 3.8 | 18 | 3.3 | 0.74 |

*Suitable Comparative Examples without surfactant for Examples 20 and 21 containing 40 wt. % glass fiber could not be successfully processed on a single or twin screw extruder.

EXAMPLES 22 TO 26 AND COMPARATIVE EXAMPLE 3

The composition and physical properties of these Examples are shown in Table III. These Examples demonstrate the formulation flexibility (ranges of polymeric components) of the wetting agent modified blends containing 15 wt. % glass fibers. The general trends demonstrated are high "Surlyn"/low HDPE gives tougher, lower modulus compositions, while low "Surlyn"/high HDPE gives more brittle, stiffer compositions. These data also show the significance of this invention in that the surfactant-modified blend even at very low "Surlyn" concentration has improved toughness properties as compared to Comparative Examples 1 and 3 which were run at high "Surlyn" concentrations.

Example 23 and Comparative Example 3 show that the addition of surfactant to a blend containing a very high molecular weight (MI 0.04), high density polyethylene resin gives a significant improvement in toughness properties.

TABLE III

| Examples | Formulation "Surlyn"/HDPE/Glass | Wetting Agent, % | Glass Clusters (after molding) | Flex Modulus MPa | Flex Modulus kpsi | Elongation Break % | 23° C. Notched Izod J/m | 23° C. Notched Izod ft-lbs/in | Tensile Impact kJ/m² | Tensile Impact ft-lbs/in² | Gardner Impact J/mm | Gardner Impact in-lbs/mil |
|---|---|---|---|---|---|---|---|---|---|---|---|---|
| C-1c | 55/30/15 | — | None | 1205 | 175 | 20 | 378 | 7.1 | 96 | 45.1 | 1.9 | 0.42 |
| C-3* | 55/30/15 | — | V Few | 1186 | 172 | 10 | 349 | 6.5 | 124 | 59 | 2.7 | 0.6 |
| 22 | 55/30/15 | No. 1 0.25 | None | 1220 | 177 | 50 | 879 | 16.5 | 170 | 81 | 7.0 | 1.6 |
| 23* | 55/30/15 | No. 1 0.5 | None | 1069 | 155 | 65 | 701 | 13.0 | 144 | 69 | 7.1 | 1.6 |
| 24 | 45/40/15 | No. 1 0.25 | None | 1332 | 193 | 90 | 817 | 15.3 | 207 | 99 | 7.8 | 1.76 |
| 25 | 25/60/15 | No. 1 0.5 | None | 1384 | 201 | 110 | 446 | 8.4 | 129 | 61.3 | 5.8 | 1.3 |
| 26 | 5/80/15 | No. 1 0.5 | None** | 1740 | 252 | 200 | 766 | 14.3 | 133 | 65.9 | 4.0 | 0.9 |

*In these runs a lower melt index (0.04 vs 0.45) HDPE was evaluated
**Injection molded plaques from this run showed warpage

EXAMPLES 27 TO 30 AND COMPARATIVE EXAMPLES 4 AND 5

The composition and physical properties of these Examples are given in Table IV. These Examples demonstrate formulation flexibility, improved toughness and flexibility as well as the elimination of glass clusters over a wide range of glass fiber concentrations (20-50 wt. %). All of these runs were made at wetting agent concentration levels designed to give an optimum balance of properties.

Examples 19, 27 and 28 compared to Comparative Examples 2, 4 and 5 show a significant improvement in toughness and flex properties at all three glass fiber levels (20, 25 and 35 wt. %). It became apparent from this data that overall improvement in toughness properties of surfactant-modified blends diminishes with higher glass fiber content. We were unable to prepare suitable test samples containing more than 35 wt. % glass fiber blends without surfactant on our single and twin screw extruders. Examples 29 and 30 show that we can process surfactant-modified blends containing up to 50 wt. % glass fiber on either a single (40 wt. % glass fiber) or a twin screw extruder (50 wt. % glass fiber).

TABLE IV

| Examples | Formulation "Surlyn" HDPE/Glass | Wetting Agent, % | Glass Clusters (after molding) | Flex Modulus MPa | Flex Modulus kpsi | Elongation Break % |
|---|---|---|---|---|---|---|
| C-2 | 50/30/20 | — | V few | 1408 | 204 | 5 |
| 19 | 50/30/20 | No. 1 0.25 | None | 1495 | 217 | 50 |
| C-4 | 50/25/25 | — | Many | 1687 | 245 | 5 |
| 27 | 50/25/25 | No. 1 0.5 | None | 1697 | 246 | 35 |
| C-5 | 45/20/35 | — | Many | 2511 | 364 | 5 |
| 28 | 45/20/35 | No. 1 0.5 | None | 2414 | 350 | 10 |
| 29(1) | 40/20/40 | No. 1 0.5 | None | 3158 | 458 | 10 |
| 30(1)(2) | 40/10/50 | No. 1 2.5 | None | 2599 | 377 | 5 |

I claim:
1. A composition having improved toughness and flexibility consisting essentially of

(a) from about 5 to about 85 percent by weight of acid copolymer selected from the group consisting of direct copolymers and graft copolymers wherein,
(A) said direct copolymer is the copolymer of α-olefin having the formula R—CH═CH$_2$, where R is a radical selected from the class consisting of hydrogen and alkyl radicals having from 1 to 8 carbon atoms and α,β-ethylenically unsaturated caboxylic acids having from 3 to 8 carbon atoms, the acid moieties being randomly or nonrandomly distributed in the polymer chain,
(1) the α-olefin content of the copolymer being at least 25 weight percent, based on the α-olefin-acid copolymer,
(2) the unsaturated carboxylic acid content of the copolymer being from about 0.5 to about 50 weight percent, based on the α-olefin-acid copolymer, and
(3) any other monomer component optionally copolymerized in said copolymer being monoethylenically unsaturated, and
(B) said graft copolymer is obtained by grafting 0.1 to 5 percent by weight of α,β-unsaturated carboxylic acid having 3 to 8 carbon atoms or an unsaturated carboxylic acid anhydride onto a preformed polyolefin backbone derived from ethylene or ethylene and C$_3$ to C$_8$ α-olefin, in which polyolefin backbone any other optionally copolymerized monomer component is monoethylenically unsaturated, said direct or graft acid copolymers having from 0 to about 90 percent of the caboxylic acid groups ionized by neutralization with metal ions, said ionic copolymers having solid state properties characteristic of crosslinked polymers and melt-fabricability properties characteristic of uncrosslinked thermoplastic polymers,
(b) from about 10 to about 90 percent by weight of at least one hydrocarbon polyolefin selected from the group consisting of linear polymer of α-olefin having the formula R—C═CH$_2$, where R is a radical selected from the class consisting of hydrogen and alkyl radicals having from 1 to 8 carbon atoms; copolymer of ethylene and propylene where the ethylene content is up to about 20% by weight; linear copolymer of ethylene with at least one α-olefin comonomer having from 4 to 10 carbon atoms, where the α-olefin comonomer content is from about 2 to about 25 percent by weight; and low density branched homopolymer of ethylene;

(c) from about 5 to about 50 percent by weight of at least one reinforcing fiber selected from the group consisting of glass fiber and blends of glass fiber and mineral fiber, and (d) from about 0.05 to about 5.0 percent by weight of at least one wetting agent selected from the group consisting of alkanol amides; betaine derivatives; block copolymers comprising a series of condensates of ethylene oxide with hydrophobic bases formed by condensing propylene oxide with propylene glycol; ethoxylated compounds comprising alcohols, alkyl phenols, amines and amides; sulfonated derivatives comprising alkyl sulfonates, aryl sulfonates, alkyl-aryl sulfonates, amine and amide sulfonates, olefin aryl sulfonates, sulfosuccinates, sulfonated fatty acid esters, sulfonates of ethoxylated alkyl phenols and of oils and of fatty acids, naphthalene and alkyl naphthalene sulfonates, condensed naphthalene sulfonates, naphthalene and alkyl naphthalene sulfonates and petroleum sulfonates, and dodecyl and tridecyl benzene sulfonates; dodecyl and tridecyl sulfonic acids; sulfates of alcohols, of ethoxylated alcohols, of ethoxylated alkyl phenols, of oils, of fatty acids, of fatty esters, alkaryl sulfates, and sodium, ammonium and amine salts of alcohol sulfates; phosphate derivatives comprising phosphate esters, phosphate alcohol ethoxylates, phosphate ether ethoxylates, phosphate alkyl acids and phosphate alkyl quaternaries; quaternary surfactants; and liquid polyesters.

2. The composition of claim 1 wherein the acid copolymer is direct copolymer and is present in an amount of from about 20 to about 60 percent by weight, said copolymer having a melt index of from about 0.1 to about 100 and having from about 5 to about 80 percent of the carboxylic acid groups ionized by neutralization with metal ions selected from the group consisting of sodium, potassium, calcium, magnesium, zinc and strontium, the α-olefin content of the copolymer being at least 70 weight percent, based on the α-olefin-acid copolymer, and the unsaturated carboxylic acid content of the copolymer being from about 1 to about 12 mole percent, based on the α-olefin-acid copolymer, and wherein the reinforcing fiber has an L/D aspect ratio of from about 10 to about 1500.

3. The composition of claim 2 wherein the hydrocarbon polyolefin is present in an amount of from about 20 to about 55 percent by weight, is selected from the group consisting of polyethylene, polypropylene, polybutylene-1, poly-4-methyl pentene-1, and copolymers thereof, and when the linear polyolefin is polyethylene it has a density of from about 0.935 to about 0.970 and a melt index of from about 0.2 to about 5.

4. The composition of claim 3 wherein the reinforcing fiber is present in an amount of from about 10 to about 35 percent by weight and is selected from the group consisting of glass fibers having an L/D aspect ratio of from about 20 to about 1000.

5. A composition of claim 4 wherein the wetting agent is present in an amount of from about 0.1 to about 2.5 percent by weight and is selected from the group consisting of alkanol amides; betaine derivatives; block copolymers consisting essentially of a series of condensates of ethylene oxide with hydrophobic bases formed by condensing propylene oxide with propylene glycol; ethoxylated compounds consisting essentially of ethoxylated alcohols, alkyl phenols, amines and amides; sulfonated derivatives consisting essentially of alkyl sulfonates, alkyl-aryl sulfonates, amine and amide sulfonates, sulfonated fatty acid esters, sulfonates of ethoxylated alkyl phenols and of oils and of fatty acids, naphthalene and alkyl naphthalene sulfonates, and condensed naphthalene sulfonates and dodecyl and tridecyl benzene sulfonates; sulfates of alcohols, of ethoxylated alcohols, of fatty acids, alkaryl sulfates, and sodium, ammonium and amine salts of alcohol sulfates; phosphate derivatives consisting essentially of phosphate esters, phosphate alcohol ethoxylates, phosphate ether ethoxylates, phosphate alkyl acids and phosphate alkyl quaternaries; quaternary surfactants; and polyesters that are liquid condensation products of (a) dibasic acid selected from the group consisting of saturated aliphatic dibasic acids and aromatic dibasic acids and (b) polyol selected from the group consisting of aliphatic polyols and polyoxyalkylenepolyols.

6. The composition of claim 5 wherein the α,β-ethylenically unsaturated carboxylic acid is selected from the group consisting of acrylic acid and methacrylic acid.

7. The composition of claim 6 wherein the acid copolymer is present in an amount of from about 25 to about 55 percent by weight, the α,β-ethylenically unsaturated carboxylic acid is methacrylic acid and is present in the amount of from about 3 to about 12 weight percent, said copolymer having a melt index of from about 0.3 to about 1.5 and having from about 15 to about 75 percent of the carboxylic acid groups ionized by neutralization with zinc ions, the α-olefin is ethylene and is present in the amount of at least about 88 weight percent, based on the α-olefin-acid copolymer.

8. The composition of claim 7 wherein the hydrocarbon polyolefin is polyethylene and is present in an amount of from about 20 to about 55 percent by weight, has a density of from about 0.95 to about 0.97 and a melt index of from about 0.3 to about 3.

9. The composition of claim 8 wherein the reinforcing fiber is glass fiber having an L/D aspect ratio of from about 100 to about 400 and is present in an amount of from about 12 to about 25 percent by weight.

10. The composition of claim 9 wherein the wetting agent is selected from the group consisting of sulfonated derivatives consisting essentially of alkyl sulfonates, alkyl-aryl sulfonates, amine and amide sulfonates, sulfonated fatty acid esters, sulfonates of ethoxylated alkyl phenyls and of oils and of fatty acids, naphthalene and alkyl naphthalene sulfonates, and condensed naphthalene sulfonates; sulfates of alcohols, of ethoxylated alcohols, of fatty acids, alkaryl sulfates, and sodium, ammonium and amine salts of alcohol sulfates; phosphate esters; and liquid polyesters wherein the dibasic acid is selected from the group consisting of adipic acid, azelaic acid, phthalic acid, sebacic acid, glutaric acid and mixtures thereof and wherein the polyol is selected from the group consisting of ethylene glycol, propylene glycol, 1,3-butane glycol, 1,4-butane glycol, diethylene glycol and polyethylene glycol.

11. The composition of claim 10 wherein in the liquid polyester the dibasic acid is selected from the group consisting of adipic acid and azelaic acid and the polyol is selected from the group consisting of propylene glycol, 1,3-butane glycol and 1,4-butane glycol.

12. The composition of claim 1 wherein the acid copolymer is graft copolymer.

13. The composition of claim 12 wherein the acid copolymer is a blend of graft copolymer and direct copolymer.

* * * * *

UNITED STATES PATENT OFFICE
CERTIFICATE OF CORRECTION

PATENT NO. : 4,477,617
DATED : October 16, 1984
INVENTOR(S) : Charles Vincent Murphy It is certified that error appears in the above-identified patent and that said Letters Patent are hereby corrected as shown below:

Column 12, lines 8 and 45, "caboxylic" should read -- carboxylic --.

Signed and Sealed this

Sixteenth Day of July 1985

[SEAL]

Attest:

DONALD J. QUIGG

Attesting Officer     Acting Commissioner of Patents and Trademarks